United States Patent
Rehkemper et al.

(12)
(10) Patent No.: US 6,264,283 B1
(45) Date of Patent: Jul. 24, 2001

(54) ADJUSTABLE WHEEL FOR TOY VEHICLES

(76) Inventors: Steven Rehkemper, 1030 N. State St., Apt. 29E; Jeffrey Rehkemper, 329 W. Evergreen, both of Chicago, IL (US) 60610; Todd Hannon, 2202 N. Bissell, Chicago, IL (US) 60614

( * ) Notice: Subject to any disclaimer, the term of this patent is extended or adjusted under 35 U.S.C. 154(b) by 0 days.

(21) Appl. No.: 09/494,639

(22) Filed: Jan. 31, 2000

(51) Int. Cl.$^7$ ............ B60B 27/00; B62D 55/07; A63H 17/14; A63H 17/00
(52) U.S. Cl. ............ 301/5.1; 301/185.1; 446/433; 446/465; 305/19
(58) Field of Search ............ 301/1, 5.1, 105.1; 305/6, 7, 19; 446/433, 465, 469

(56) References Cited

U.S. PATENT DOCUMENTS

| | | | |
|---|---|---|---|
| 3,459,454 | * 8/1969 | Liston | 301/19 |
| 3,802,743 | * 4/1974 | Hermanns | 301/5.1 |
| 4,547,173 | * 10/1985 | Jaworski et al. | 446/465 |
| 4,601,519 | * 7/1986 | D'Andrade | 446/465 |
| 4,643,696 | * 2/1987 | Law | 446/465 |
| 4,773,889 | * 9/1988 | Rosenwinkel et al. | 446/465 |
| 5,102,367 | * 4/1992 | Mullaney et al. | 446/465 |
| 5,487,692 | * 1/1996 | Mowrer et al. | 446/465 |
| 5,492,390 | * 2/1996 | Kugelmann, Sr. | 301/5.1 |
| 5,839,795 | * 11/1998 | Matsuda et al. | 301/5.1 |

* cited by examiner

Primary Examiner—S. Joseph Morano
Assistant Examiner—Jason R. Bellinger

(57) ABSTRACT

An adjustable wheel assembly is provided and includes two pairs of oppositely disposed rim sections. The wheel assembly is normally biased in a circular configuration by a resilient tire disposed over the rim sections. A device for movably mounting the rim sections is employed to move the rims from their circular configuration to an oval configuration. When positioned in the oval configuration the wheel assembly applies maintaining and releasing device to prevent and permit movement of the rim sections between the circular and oval position.

20 Claims, 4 Drawing Sheets

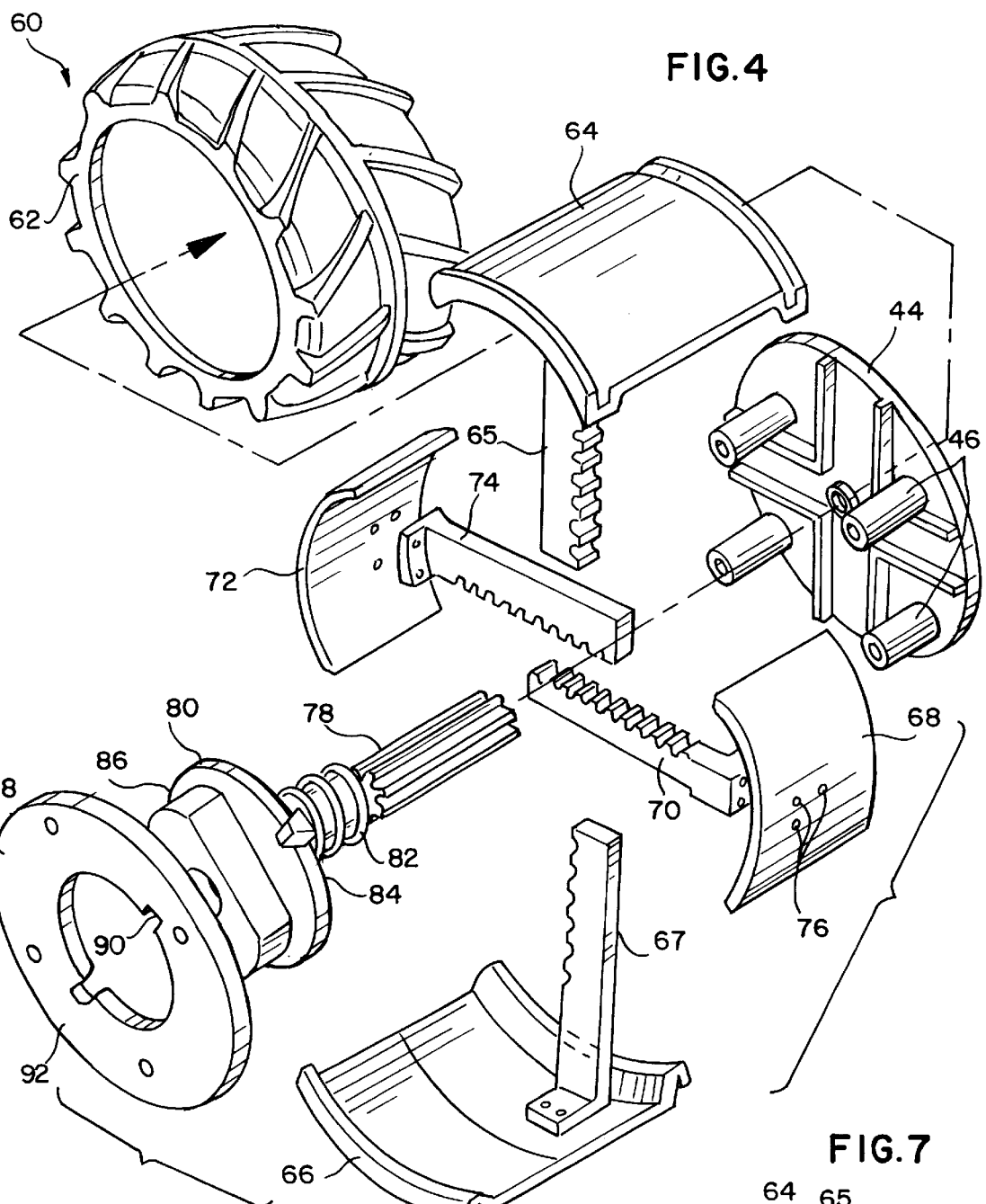
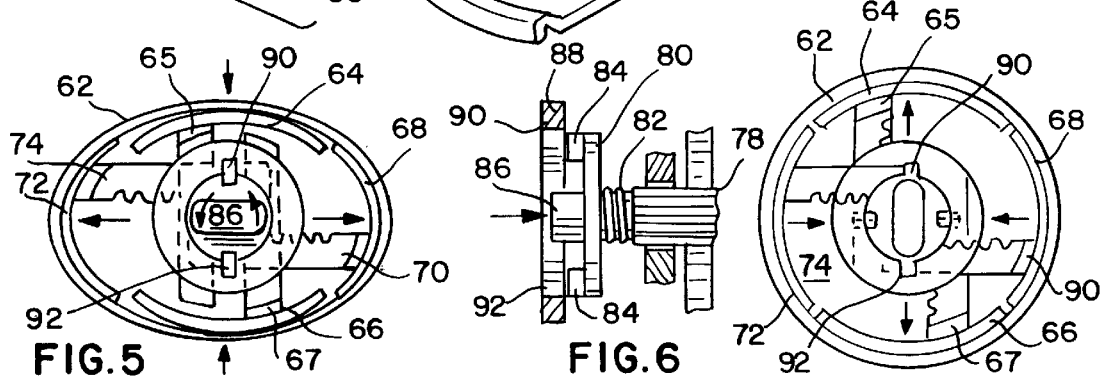

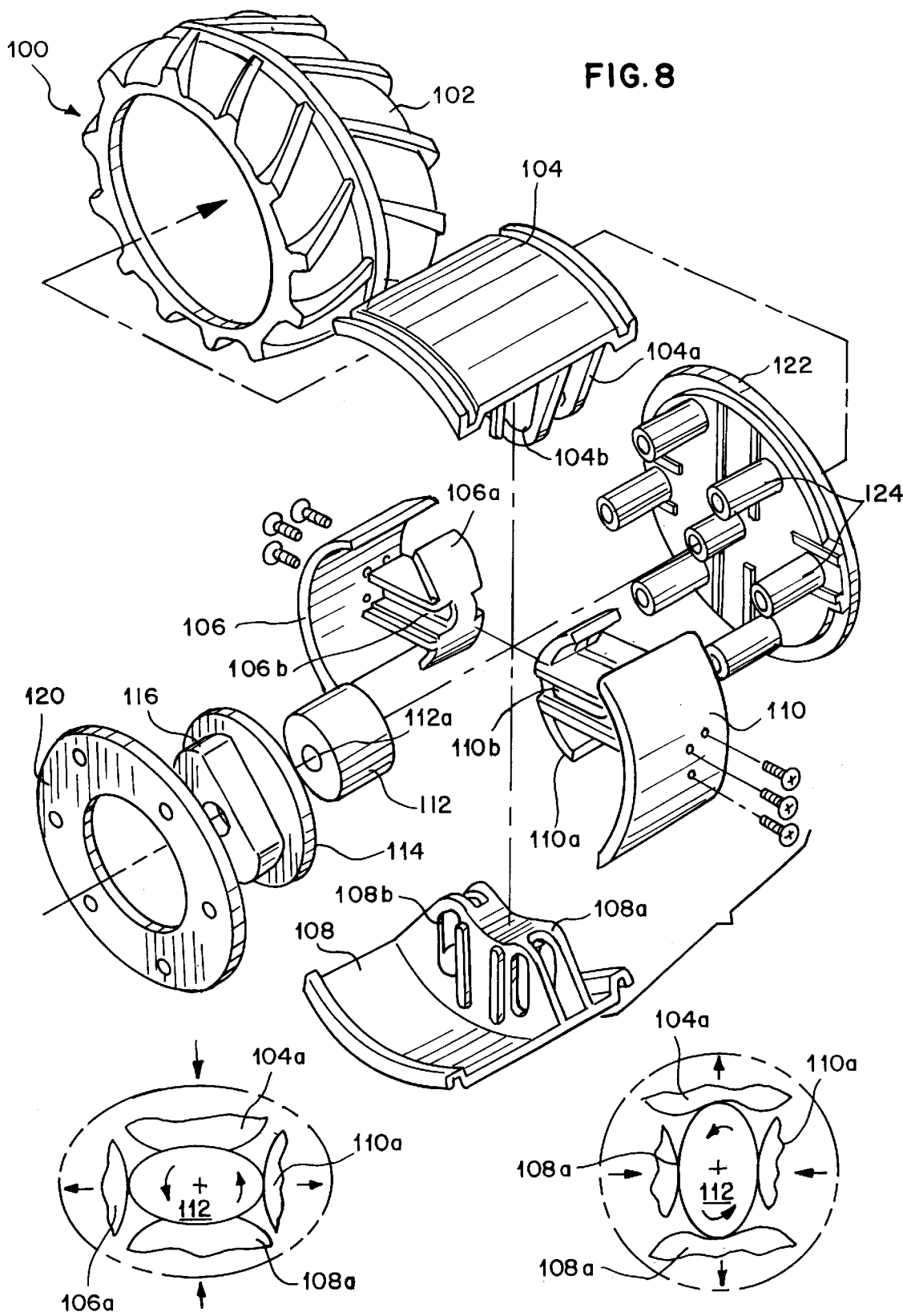

US 6,264,283 B1

ADJUSTABLE WHEEL FOR TOY VEHICLES

FIELD OF THE INVENTION

The present invention relates generally to wheels for toy vehicles and more particularly, to wheels for toy vehicles that are capable of being adjusted to various positions quickly and effectively.

BACKGROUND OF THE INVENTION

Toy track wheels are typically round or circular in shape and will provide the conventional driving mode for a toy car whether the toy car is power driven or is manually moved. Where in the case of the conventional toy vehicle the car will move in a straight line and generally can not overcome many obstacles that it may encounter. It can be appreciated that if the wheels had various configurations, such as, elliptic or oval, the vehicle could act very much like a Caterpillar™ track, where it could climb over the obstacle or in the event of running into an encumbrance, such as a wall, it would tend to move up the encumbrance and possibly fall over backwards. Having different wheel configurations, the movement of the vehicle will become erratic, thus in all likelihood will add pleasure to the vehicle when played with.

SUMMARY OF THE INVENTION

In accordance with the present invention there is provided a novel wheel which can be readily moved and retained in either the conventional circular configuration or can be moved quickly and efficiently into an oval shape. Essentially, the wheel is spring biased and consists of four rim sections, which tend to retain the wheel in a circular configuration. When it is desired to move the wheel to an oval arrangement oppositely extending rigid rims are moved toward each other. At the same time two flexible rims disposed between the adjacent rigid rims are moved outwardly, thus expanding the tire into an oval configuration. To retain it in the oval configuration the rigid rims are secured in position by a locking means. A simple release mechanism is provided to disengage or release the rigid rims from the locking means. Due to normal resiliency of the tire the rigid rims move outwardly and the flexible rims inwardly, thus returning the wheel to its circular configuration.

In a second embodiment, a wheel assembly is provided with a similar construction. However, the rims include gears racks that engage a pinion gear mechanism. The gear mechanism moves the flexible rims outwardly, at the same time it moves the rigid rims inwardly, positioning the wheel in the oval configuration. The gear arrangement also includes a keying system that inter-engages a plate, such that when engaged the gears are locked in the given position. In order to return the wheel to its circular configuration, a transformation knob is moved inwardly which disengages the key and permits the resiliency of the tire to move the flexible and rigid rims back to their circular orientation.

In yet another embodiment, a mechanism for engaging the rims consists of a cam arrangement. The arrangement includes a center cam that engages cam section on the rims. When the center cam is turned, the rims move a sufficient amount to form the oval configuration. Similarly, when the cam is turned again the tire functions to move the flexible rims inwardly which will, due to a camming function, move the rigid rims outwardly and return the wheel to the circular position.

BRIEF DESCRIPTION OF THE DRAWINGS

A fuller understanding of the foregoing may be had by reference to the accompanying drawings, wherein:

FIG. 4 is an exploded perspective view of a second embodiment of the invention;

FIG. 5 is a side view particularly broken away showing the position of the various components of FIG. 4 when the wheel assembly is in an oval condition;

FIG. 6 is a cross sectional view showing the interaction between the transformation mechanism and pinion gear;

FIG. 7 is a view showing the position of the mechanism when the wheel assembly is in a generally circular arrangement;

FIG. 8 is an explode perspective view of a third embodiment of the invention;

FIG. 9 is a view showing the position of the cam to move the rim segments in an oval condition; and FIG. 10 is an arrangement of the cam and rim segments when the wheel assembly is in a circular position.

DETAILED DESCRIPTION OF THE DRAWINGS

Figures 1, 2:
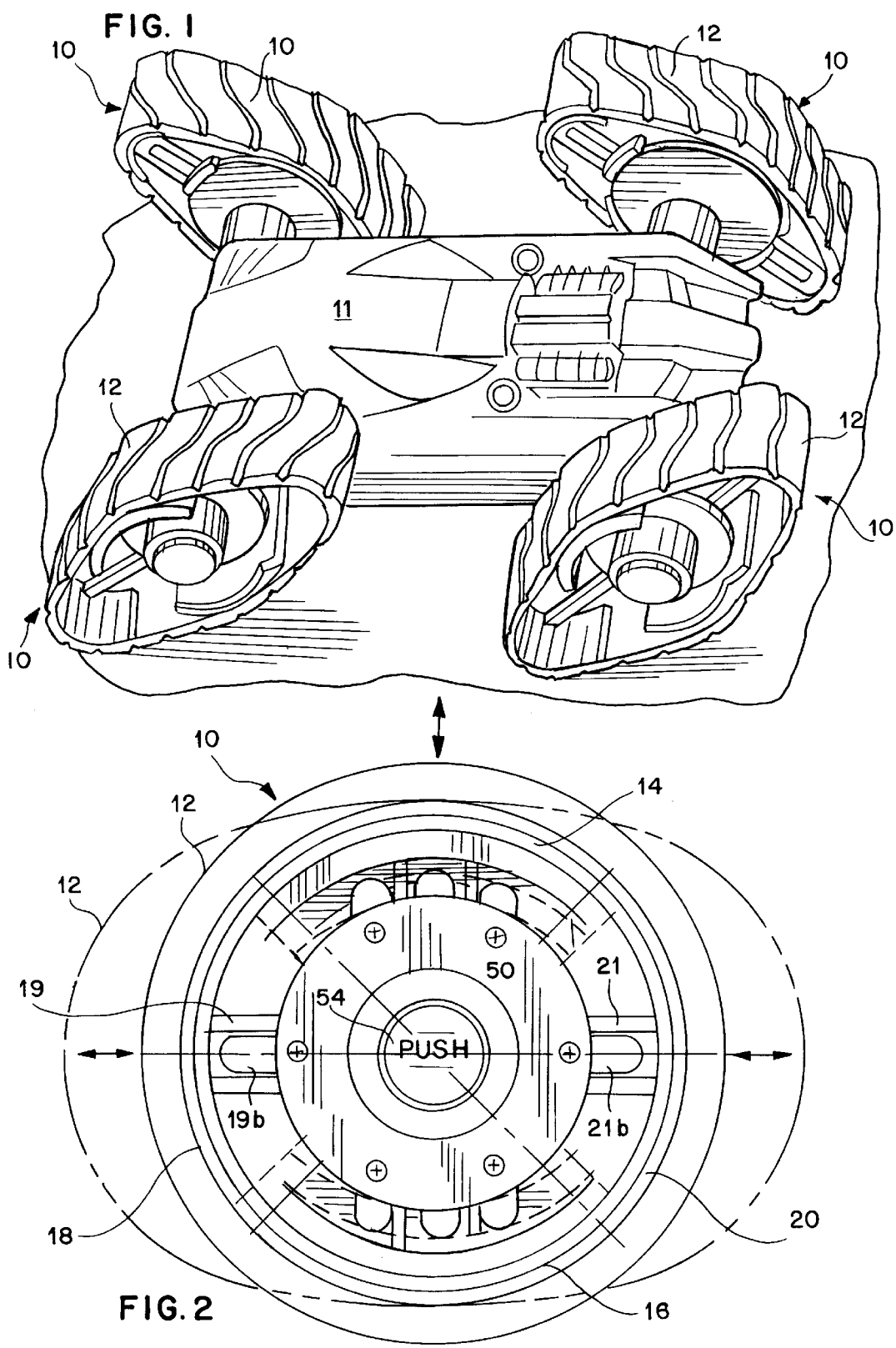
FIG. 1 is a perspective view of a toy vehicle with four wheel assemblies, all being shown in an oval configuration.
FIG. 2 is a side view of a wheel assembly showing a normal circular position, in solid lines, and, in dashed lines, the configuration the wheel assembly takes when the wheel assembly moves into the oval shape.

While the invention is susceptible of embodiments in many different forms, there is shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring first to FIG. 1, there are shown four wheel assemblies 10 that are connected to a toy vehicle 11. Each of the wheels is circumscribed by a tire 12 which is sufficiently resilient to permit extenuation of the wheel assemblies into an oval configuration, as shown in FIG. 1, but has sufficient memory to return to a circular configuration when the wheel assemblies so permit. FIG. 2 shows a side view of the wheel assembly 10 in its circular configuration, shown in solid lines, and in its oval configuration, shown as dashed lines. To understand the various components of the wheel assembly we will now turn to FIG. 3 which from the description thereof the mechanisms will be fully understood.

Figure 3:
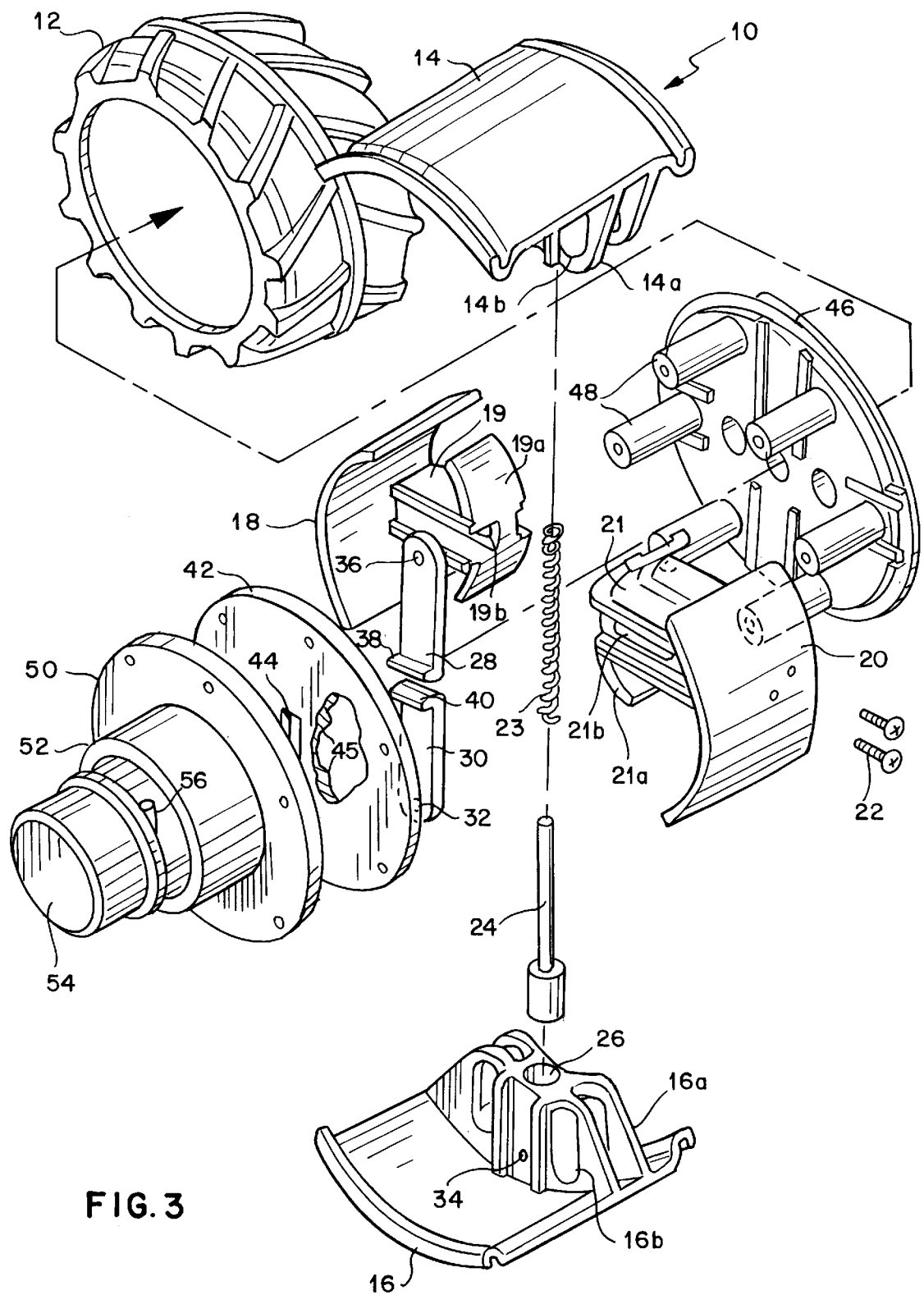
FIG. 3 is an exploded view of the various components of one embodiment of the invention.

Referring now to FIG. 3 an exploded view of the components of the wheel assembly 10 is depicted. It is shown that the tire 12 is in a circular position surrounding the various components of the wheel assembly 10. The components of the wheel assembly 10 consist essentially of two oppositely disposed, similarly constructed, rigid rims 14 and 16 (for ease of description the rigid rims may be further described as an upper rigid rim 14 and a lower rigid rim 16). Each rigid rim has a defined flange, which includes a cam surface 14a and 16a and openings 14b and 16b respectively, for reasons which will be defined in detailed hereinafter.

Located intermediate the rigid rims 14 and 16, on both sides thereof, are flexible rims 18 and 20. These rims are pliable since when the flexible rims 18 and 20 are moved outwardly the rims may bend to conform to the shape of the tire 12 and thus provide an elliptical driving surface. The rigid rims 14 and 16 retain their contour and tend to maintain the tire in a requisite position to provide driving surfaces intermediate of the flexible rims. Each flexible rim 18 and 20 is connected by screws 22 to one of the slider assemblies 19 and 21 respectively. The slider assemblies 19 and 21 define at their outer regions cam surfaces 19a and 21a, which engage the cam surfaces 14a and 16a of the rigid rims 14 and 16 when the rigid rims are moved inwardly. In addition, slider assemblies 19 and 21 contain openings 19b and 21b for reasons that will be described in detail hereinafter.

The rigid rims 14 and 16 are normally biased in an outward position by a compression spring 23, which is disposed about a spring retainer 24. The spring retainer 24 fits into an opening 26 in one of the rigid rims, as shown the opening 26 is positioned in the lower rigid rim 16. The rigid rims 14 and 16 are thus normally biased outwardly, thus disposing the tire 12 in the circular configuration. As a consequence the tire 12 will normally be biasing the flexible rims 18 and 20 inwardly.

In order to move the wheel assembly 10 from the circular to the oval configuration the rigid rims 14 and 16 are moved inwardly towards the center of the wheel assembly 10 and against the compression force of the compression spring 23. The rigid rims' cam surfaces 14a and 16a engage the cam surfaces 19a and 21a of the slider assemblies 19 and 21 and move the flexible rims outwardly, forming the oval configuration. To retain the wheel in the oval configuration there is provided a latching means.

The latching means includes an upper and lower resilient latch 28 and 30, which are normally biased longitudinally outward against the inner surface of the locking plate 42. The upper and lower resilient latches 28 and 30 each have a latching flange 38 and 40 respectively. The upper resilient latch 28 is secured to the upper rigid rim 14 by a screw, which extends through an aligned opening 36 in the upper resilient latch 28, into an opening in the upper rigid rim 14, not shown. Similarly, the lower resilient latch 30 has an opening 32 aligned with an opening 34 in the lower rigid rim 16 through which a screw secures the lower resilient latch 30 in place.

The latching means further includes a locking plate 42 which has a notch 44 and an upper and lower ledge 45. When the rigid rims 14 and 16 are moved inwardly a sufficient amount, against the compression spring 23, latching flanges 38 and 40, which are biasing longitudinally against the inner surface of the locking plate 42, engage the upper and lower ledges 45 respectively, such that once engaged the rigid rims 14 and 16 are prevented from moving outwardly. It can be seen from the above that when the rigid rims 14 and 16 are placed in that position the wheel will be retained in the oval configuration.

At the front of the wheel assembly 10 there is provided a front plate 50. The front plate has an embossing flange 52. Disposed on the embossing flange is a release button 54 that has a projection 56. Contained with the embossing flange 52 is a spring means (not shown), which normally biases the projection 56 longitudinally outward. When the release button 54 is moved in the longitudinal inward direction, the projection 56, moving against the spring means, extends through the notch 44 on the locking plate 42 and forces the latching flanges 38 and 40 to disengage the ledges 45. Once the latching flanges 38 and 40 disengage the upper and lower ledges 45 the compression spring 23 moves the rigid rims 14 and 16 outwardly, further permitting the resiliency of the tire 12 to move the flexible rims 18 and 20 inwardly, and thus returning the wheel assembly to the circular configuration.

It remains to note that all the components of the wheel assembly are retained in position by screws, not shown, which extend through aligned openings in the front plate 50, openings in the locking plate 42, and openings 14b, 16b, 19b, and 21b in the rims and into bushings 48 connected to a back plate 46. Thus, the completed assembly will be compact yet whenever desired will permit interchangeable arrangements between the circular and oval configurations.

Referring now to FIGS. 4–7, a second embodiment of a wheel assembly 60 is depicted. It is shown that a resilient tire 62 is in a circular configuration surrounding the various components of the wheel assembly 60. As described above, the wheel assembly consists of two pairs of oppositely disposed rims, a pair of rigid rims 64 and 66 and a pair of flexible rims 68 and 72. However, in this embodiment each rim has a gear rack extending towards the center of the wheel assembly 60, rigid gear rack 65 and 67 on rigid rims 64 and 66 respectively and flexible gear rack 70 and 74 on respective flexible rims 68 and 72. Each gear rack is secured to its respective rim by screws, which extend through openings 76, on each individual rim.

A pinion gear mechanism 78 engages the gear racks 65, 67, 70 and 74 and is employed to move the wheel assembly from its circular configuration to its oval configuration, shown in FIG. 5. When the pinion gear mechanism 78 is rotated the flexible gear racks 70 and 74 laterally move their respective flexible rims 68 and 72 outwardly, against the resiliency of the tire 62. During the lateral movement of the flexible rims the pinion gear mechanism further moves the rigid rims 64 and 66 inwardly by engaging their respective rigid gear racks 65 and 67, thus positioning the rims such that the wheel assembly 60 is in the oval configuration.

In order to maintain the wheel assembly 60 in the oval configuration the pinion gear mechanism 78 is secured to a transformation knob plate 80, shown in FIG. 6. Disposed between the pinion gear mechanism 78 and the transformation knob plate 80 is a compression spring 82, which normally biases the transformation knob plate longitudinally outward. The transformation knob plate has a pair of locking keys 84 (on either side of the transformation knob plate) and a transformation knob 86. When the transformation knob 86 is turned the pinion gear mechanism causes the rims to orient against the resiliency of the tire 62 to the oval configuration, as described above. The spring 82 exerts a longitudinal force on the transformation knob plate 80 such that when the plate 80 is turned a sufficient amount, the locking keys 84 extend into notches 90 and 92 on a front plate 88, thereby securing the wheel assembly in the oval configuration.

When the transformation knob plate 80 is pushed inward the locking keys 84 slide out of the notches 90 and 92. The resiliency of the tire 62 tends to move the flexible rims 68 and 72 inwardly, causing the pinion gear mechanism 78 to rotate, laterally moving the rigid rims 64 and 66 outwardly and thereby returning the wheel assembly to the circular configuration, best seen in FIG. 7. Similarly, when the wheel assembly 60 is positioned in its circular configuration the locking keys 84 may engage the notches 90 and 92, thus locking the wheel assembly in the circular configuration as well as the oval configuration.

Continuing to refer to FIG. 4, the components of the wheel assembly 60 are retained in position by screws, not shown, which extend through aligned openings in the front plate 80 and into bushings 96 on a back plate 94.

Referring now to FIGS. 8–10, there is shown a wheel assembly 100 having a resilient tire 102 in a circular configuration surrounding the various components. The wheel assembly 100 is similarly made up of two rigid rims 104 and 108 oppositely disposed. Each rigid rim 104 and 108 has a cam surface 104a and 108a as well as cam openings 104b and 108b discussed in greater detail below. Located between the rigid rims 104 and 108 are flexible rims 106 and 110, which have a flexible slider 106a and 110a, and flexible rim openings 106b and 110b, respectively.

When assembled the cam surfaces 104a and 108a of the rigid rims and the flexible sliders 106a and 110a of the flexible rims contact a center cam 112, best seen in FIGS. 9 and 10. When the center cam 112 is positioned as shown in FIG. 9 the rigid rims 104 and 108 move inwardly and the flexible rims 106 and 110 move outwardly, against the resiliency of the tire 102, forming the oval configuration. Similarly, when the center cam 112 is again rotated, as shown in FIG. 10, the rigid rims 104 and 108 move outwardly from the center, the resiliency of the tire 102 tends to move the flexible rims 106 and 110 inwardly, thus returning the wheel assembly 100 its circular configuration.

Continuing to refer to FIG. 8, center cam 112 is secured to a transformation knob plate 114. The cam is rotated by turning a transformation knob 116 on the plate 114. The components of the wheel assembly 100 are retained in position by screws, not shown, which extend through aligned openings in a front plate 120 and the openings in the rims 104b, 106b, 108b, and 110b and into bushings 124 on a back plate 122.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An adjustable wheel assembly comprising:
   a rim construction consisting of a plurality of rim sections;
   a resilient covering means disposed over the rim construction for maintaining the rim sections in a circular configuration;
   means for movably mounting the rim sections whereby the rim construction can be moved from the circular orientation to an oval configuration;
   means for maintaining the rim sections in the oval configuration; and
   means for releasing the maintaining means whereby the wheel can be returned to the circular configuration.

2. The adjustable wheel assembly of claim 1 wherein the rim sections comprises two flexible segments and two rigid segments.

3. The adjustable wheel assembly of claim 2 further comprising a spring means biasing the rigid segments outwardly defining the circular configuration.

4. The adjustable wheel assembly of claim 3 wherein the rigid segments and the flexible segments define interengaging cam surfaces.

5. The adjustable wheel assembly of claim 4 further comprising:
   slider members secured to the flexible segments, the slider members defining cam surfaces; and
   the rigid segments define cam surfaces, wherein the cam surfaces of the rigid segments engage the cam surfaces of the flexible segments, such that when the rigid segments are moved inwardly against the outward biasing spring means the flexible segments are moved outwardly against the resilient covering means.

6. The adjustable wheel assembly of claim 5 wherein the maintaining means engages the rigid segments such that outward movement is prevented.

7. The adjustable wheel assembly of claim 6 wherein the maintaining means includes:
   a locking plate having an upper and lower ledge; and
   a resilient latch having a flange and secured to each rigid segment, each resilient latch being biased longitudinally outward such that when the rigid segments are moved inwardly the flanges engage the ledges of the locking plate and prevent the rigid segments from being moved outwardly.

8. The adjustable wheel assembly of claim 7 wherein the releasing means includes a release button being positioned such that the release button may disengage the flanges from the locking plate.

9. The adjustable wheel assembly of claim 8 wherein the releasing means includes a projection fastened to the release button, and a notch defined in the locking plate, such that when the release button is depressed the projection is moved through the notch disengaging the flanges from the ledges.

10. The adjustable wheel assembly of claim 9 wherein when the flanges disengage the locking plate the biasing spring means causes the rigid segments to move outwardly against the resilient covering means and causing the resilient covering means to move the flexible segments inwardly thus returning the adjustable wheel assembly from the oval configuration to the circular configuration.

11. The adjustable wheel assembly of claim 10 wherein the resilient covering means is a tire.

12. An adjustable wheel assembly for a toy vehicle comprising:
    a rim construction consisting of a plurality of rim sections;
    a resilient tire disposed over the rim sections for maintaining the wheel in a circular configuration;
    a gear rack attached to each of the sections;
    a pinion gear mechanism engaging the gear racks to move the rim sections between a circular and oval position; and
    means for locking and releasing the pinion gear to prevent and permit movement of the rim sections between the circular and oval positions.

13. The adjustable wheel assembly of claim 12 wherein the plurality of rim sections consists of two oppositely disposed rigid segments and two oppositely disposed flexible segments.

14. The adjustable wheel assembly of claim 13 wherein the locking and releasing means comprises:
    a knob assembly reciprocally mounted relative to the pinion gear mechanism, such that when the pinion gear mechanism is turned the knob assembly is turned;
    a key secured to the knob assembly;
    a spring means longitudinally biasing the knob assembly outwardly; and
    a plate defining a spaced notch means, the spaced notch means is defined for receiving the key, such that when the key is inserted in the spaced notch means the pinion gear mechanism and the rim sections are locked in the circular or oval position.

15. The adjustable wheel assembly of claim 14 wherein when the knob assembly is moved inwardly against the longitudinally biasing the key disengages the spaced notch means causing the resilient tire to move the rim sections from the oval position to its circular position.

16. The adjustable wheel assembly of claim 15 further comprising:

a housing for the wheel construction consisting of a back plate secured to the plate.

17. An adjustable wheel assembly for a toy vehicle comprising:

a rim construction consisting of two pairs of oppositely disposed rigid and flexible sections defining a circular configuration, the rigid and flexible sections defining adjacent surfaces;

a cam assembly engaging the adjacent surfaces to move the sections between the circular and an oval configuration; and a resilient tire disposed over the rim construction for maintaining the rim construction in the circular configuration.

18. The wheel assembly of claim 17 wherein the cam assembly is shaped to engage the adjacent surfaces to move the flexible sections outwardly while permitting the rigid sections to move inwardly to form the oval configuration.

19. The wheel assembly of claim 18 wherein the cam assembly is further shaped to move the rigid sections outwardly while permitting the flexible sections to move inwardly causing the resilient tire to return the wheel assembly from the oval configuration to the circular configuration.

20. The wheel assembly of claim 19 further comprising:

means for adjusting the position of the cam assembly to modify the wheel assembly between the circular and oval configurations.

* * * * *